US006766585B2

(12) United States Patent
Thomas

(10) Patent No.: US 6,766,585 B2
(45) Date of Patent: Jul. 27, 2004

(54) CLOCK MOUNTING TEMPLATE

(76) Inventor: Theresa R. Thomas, 5698 Fredericksburg Ct., Cincinnati, OH (US) 45227

( * ) Notice: Subject to any disclaimer, the term of this patent is extended or adjusted under 35 U.S.C. 154(b) by 0 days.

(21) Appl. No.: 10/280,494

(22) Filed: Oct. 28, 2002

(65) Prior Publication Data

US 2004/0078991 A1 Apr. 29, 2004

(51) Int. Cl.[7] .................................................. G01B 3/14
(52) U.S. Cl. ........................................... 33/566; 33/563
(58) Field of Search .......................... 33/1 G, 562, 563, 33/566; 968/265, 270, 391, 398, 404

(56) References Cited

U.S. PATENT DOCUMENTS 3,156,990 A * 11/1964 Dock ......................... 968/398
3,403,449 A * 10/1968 Eberlen ....................... 33/615
4,353,759 A * 10/1982 Stallings ...................... 33/563
4,497,312 A * 2/1985 Byrd .......................... 968/398
5,076,612 A * 12/1991 Nirmel ........................ 33/563
5,353,264 A * 10/1994 Corbin, III ................... 368/19
6,150,609 A * 11/2000 Baldwin ...................... 174/66
6,189,226 B1 * 2/2001 Mascarenas ................. 33/563
6,550,153 B1 * 4/2003 Keith .......................... 33/562
2003/0115767 A1 * 6/2003 Wedekind et al. ............ 33/566

* cited by examiner

*Primary Examiner*—G. Bradley Bennett
(74) *Attorney, Agent, or Firm*—Ingrid Hickman

(57) ABSTRACT

Method for using a mounting template and a mounting template for mounting a clock of any kind or size. The mounting template has a center hole used as a guide to align the center of the clock in a preselected position on the mounting surface. The mounting template is used to locate reference points and mount numbers or objects from a clock on a mounting surface. This device provides a greatly simplified solution to the very first problem in the layout of a clock.

14 Claims, 8 Drawing Sheets

CLOCK MOUNTING TEMPLATE

BACKGROUND OF THE INVENTION

This invention relates to a mounting template and particularly relates to a template for facilitating the mounting of a kit clock on any surface.

In a typical mounting technique to install a kit clock, the surface is selected to mount the kit clock. The wall is marked for placement of the center clock. The wall is then marked for the placement of the numbers of the clock taking care to insure that the location of the ultimately-formed clock numbers are properly placed in a precise pattern for utility and aesthetic purposes. The holes are formed at the markings for the center clock and the numbers. Thereafter, the numbers and the center clock are attached to and supported by supporting structures which are marked by the mounting holes.

The above-described process requires precise markings. Frequently, minor errors occur when marking the surface which result in a defective mounting installation thereby requiring correction. Otherwise, minor errors in mounting the items could present an obvious tilt or misalignment which not only could destroy the utilitarian purpose but could also be unpleasing to view.

It is important that precise locations for the center clock and the clock numbers are formed. Precise positioning and orientation of the hand may prove difficult on certain surfaces and in certain locations or under exigent circumstances where another person is unavailable to assist in mounting the clock. In these situations, positioning and orientation of the numbers may only be accomplished by estimation, or by laying the numbers out according to a predefined pattern measured on the surface. However, a typical clock arrangement may occupy a substantial area so that laying out such a pattern may be difficult and time consuming.

In any event, this entire process is time consuming, tedious and fraught with opportunities for making mistakes which result in defective mounting of a kit clock and presents a shoddy appearance which is unpleasing to the eye. As a result, there is a need for a facility or a device which will ease the burdens associated with the installation procedure noted above while providing successful results. Consequently, it would be advantageous to provide a device for efficiently laying out a pattern of numbers of a measure size and orienting the pattern with respect to the center clock.

As a solution to the problems described above, a mounting template 20 as shown primarily in FIG. 1 is used to precisely determine the location of the kit clock. Furthermore, the mounting template 20 is used to precisely determine where each number is to be installed on the wall surface relative to the center clock.

SUMMARY OF THE INVENTION

The present invention encompasses a mounting template for placing a kit clock on a mounting surface comprising a template having a first face on one side thereof, a second face on a side opposite the first face; a center hole located in the center of the mounting template; indicia formed on the first face of the template the indicia provides a location of an exterior point for mounting of a first object on the mounting surface, the indicia providing a means for guiding the user in locating a mounting point, the indicia has a predetermined degree graduations of measurements of time about a circumference of the mounting template, a layout of predetermined degree graduations for a set of vertical lines, and indicators, the set of vertical lines and the indicators provide means for measuring a mounting point relative to the center hole located in the center of the mounting template.

The first object can be selected from the group consisting of numbers, objects, symbols, or combinations thereof. In addition, the measurements of time may be selected from the group consisting of numerals, roman numerals, or foreign numbers, or combinations thereof Also, the predetermined degree graduations of measurements of time about a circumference of the mounting template may be 30 degrees. Also, the layout of predetermined degree graduations for a set of vertical lines is 30 degrees.

In one embodiment, the mounting template further comprises an adhesive material applied to the second face of the template for supporting the template in engagement with the mounting surface to provide therefor the use of the indicia in assisting in determining the location of the mounting for an attachment to be formed on the mounting surface. Alternatively, the adhesive material has a removable cover located over the adhesive material to prevent the adhesive material from undesirably contacting and adhering to other surfaces.

The present invention can also encompass a method for simplifying the layout of clocks comprising providing a mounting template; locating a surface to place a clock; marking a first mark on a surface for a center of the clock; aligning the marking over a center of the mounting template; leveling a first reference located on the template to a second reference which is horizontal to the first reference wherein the template having a first face, a second face on a side opposite the first face, and a center hole; attaching tape to the first face; placing a graduated measuring device having a first end and a second end on top of the template between a first indicator and a second indicator at a predetermined location on the graduated measuring device; marking on the surface a mark at the first center end of the measuring device and the second center end of the measuring device; inserting a mounting mechanism at the mark; attaching at least one object to the markings; attaching the mounting mechanism at the first mark for the center hole; attaching a main object to the hanging mechanism for the first mark. The graduated measuring device may be a yardstick or a pull string.

The present invention can also encompass a mounting kit for placing a kit clock on a mounting surface which comprises a graduated device and a template; the template having a first face on one side thereof; a second face on a side opposite the first face; a center hole located in the center of the mounting template; indicia formed on the first face of the template the indicia provides a location of an exterior point for mounting of a first object on the mounting surface, the indicia providing a means for guiding the user in locating a mounting point, the indicia has a predetermined degree graduations of measurements of time about a circumference of the mounting template, a layout of predetermined degree graduations for a set of vertical lines, and indicators, the set of vertical lines and the indicators provide means for measuring a mounting point relative to the center hole located in the center of the mounting template. The graduated device may be a pull string, a yardstick, and/or ruler.

DESCRIPTION OF THE PREFERRED EMBODIMENT

Reference will now be made in detail to the presently preferred embodiment of the invention, an example of which is illustrated in the accompanying drawings.

By "mounting surface" is meant any surface in which a clock may be mounted. For example, the clock may be mounted on a wall, floor, and/or ceiling.

Figure 1:
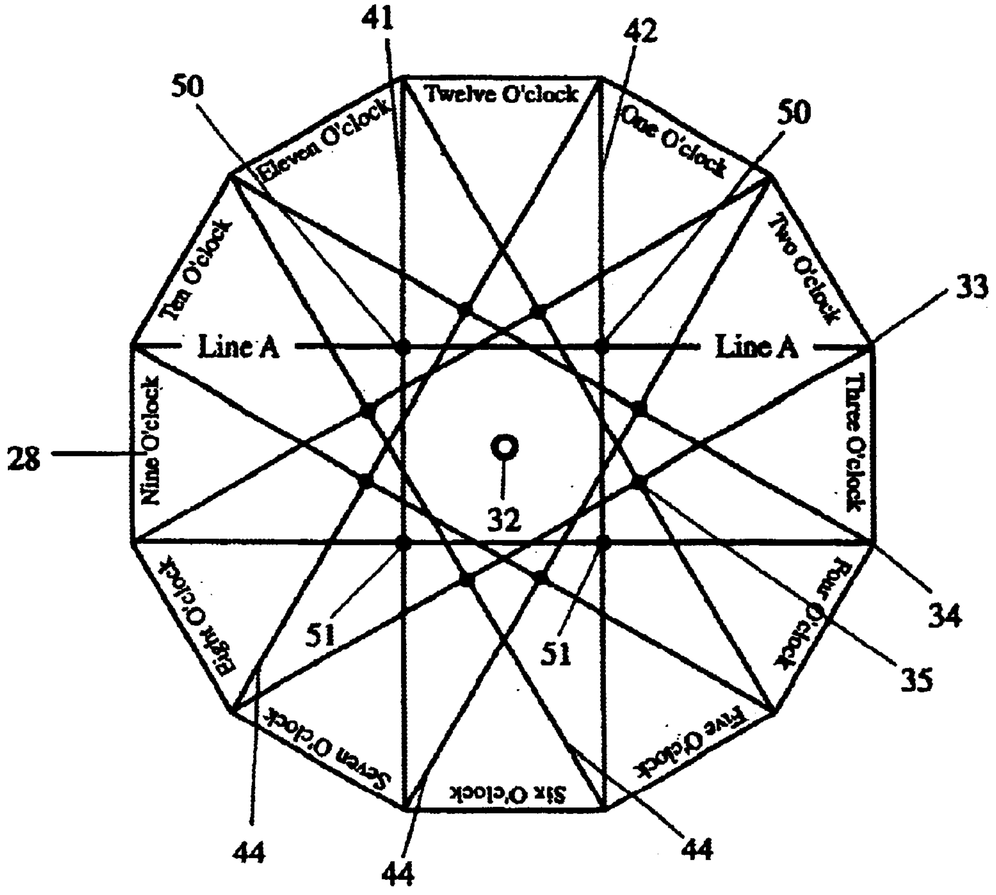
FIG. 1 is the front view showing the mounting template having indicia on the first face thereof, and embodying certain principles of the invention.
Figure 5:
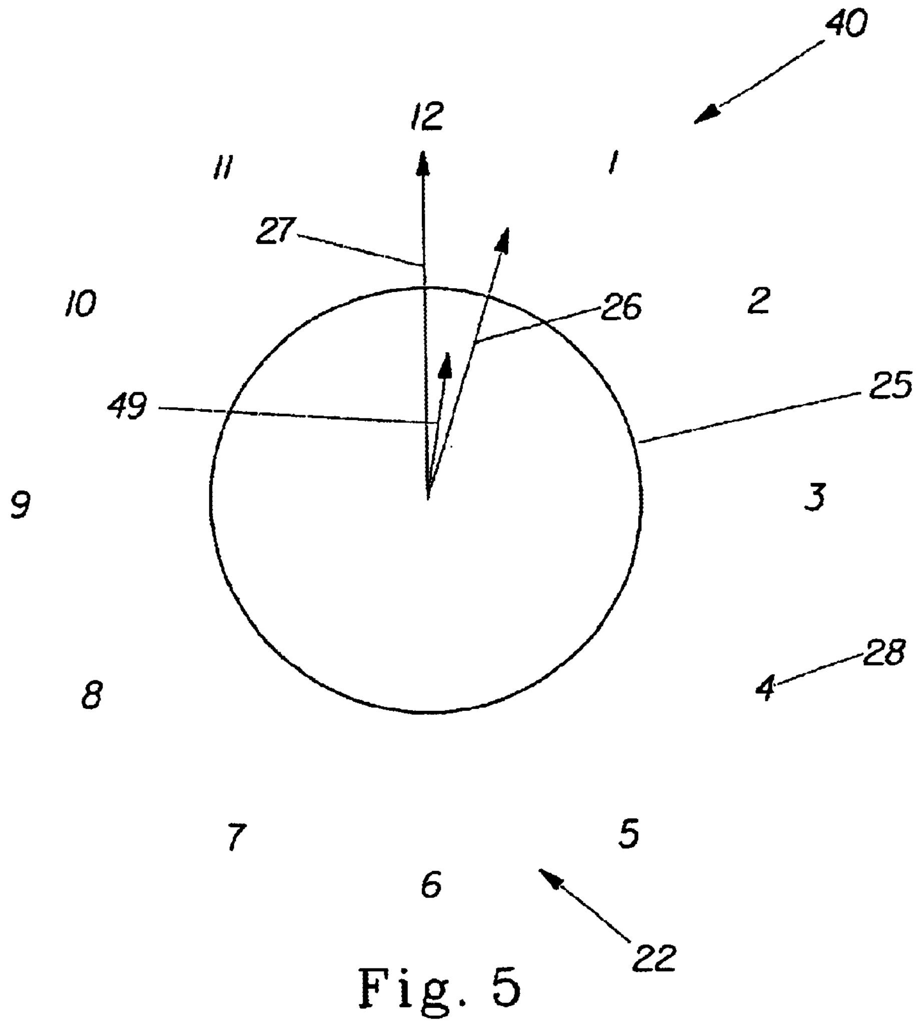
FIG. 5 is a kit clock.

By "kit clock" 40 is meant a set of parts which are assembled to make a clock. The parts may include a center 25, an hour hand 26, and measurements of time 28 (FIG. 5). The center 25 is the hub of the clock. The center 25 may contain a power source. The center 25 may also encompass an hour hand 26, minute hand 27, and/or second hand 49. In addition, the kit clock 40 encompasses measurements of time 28. One of skill in the art will readily recognize obvious variants on those presented in the patent application herein. The "measurements of time" may represent the hour, minute, and/or second of time or any measurement of time existing in any language. As shown in FIG. 1, the measurements of time 28 could be numerals. Numerals are defined as a conventional symbol that represent a number. The measurements of time 28 could also be roman numerals. Roman numerals are numerals such as I, II, III, IV, V, VI, VII, VIII, IX, X, XI, and XII. The measurements of time 28 could also be mementos, theme characters, figure, or any objects. The measurements of time may take essentially any desired shape including circles, ovals, hearts, lines, alphanumeric symbols, and various other geometric patterns.

By "clock" is meant any periodic system by which time is measured. Specifically, a clock is defined as a device other than a watch for indicating or measuring time commonly by means of numbers or any symbolism which represents numbers moving from a center.

By "indicia" is meant distinctive marks or indications.

By "mounting" is meant to attach to a mounting surface.

By "flush" is meant having surfaces in the same plane.

For a clock unit to appear in a clock-like manner, each number of the clock must be precisely positioned with respect to the other numbers of the clock. Additionally, it may be necessary to orient the entire clock with respect to the center 25 of the kit clock 40.

Referring to FIG. 1 and FIG. 5, as stated above, an objective of the present invention is to simplify the process wherein a kit clock 40 is mounted. The present invention achieves this objective by utilizing a mounting template 20 to mount a kit clock 40 on a mounting surface 22. The benefit of using the present mounting template 20 is that the consumer may make a clock which suits its needs. For example, the user may create a clock of any size. Additionally, the clock may be encased or non-encased. The present mounting template 20 may be used to create sundials, clock faces, or portions of a clock such as a quadrant of the clock. In addition, quilters may use the mounting template to quilt. For example, the mounting template 20 may be used for quilting patterns. Generally, the mounting template 20 may be used to create anything, which has a generally circular shape.

Referring to FIG. 1, the mounting template 20 may be formed of any shape or size. The mounting template 20 can be formed of any material. In one alternative embodiment, the material could be heavy weight paper. In another alternative embodiment, the material could be transparent plastic.

Referring to FIG. 1 and FIG. 5, during the mounting of a kit clock 40, the general wall location of the clock is selected. The mounting template 20 is used to mount a kit clock 40 of any size or kind. For example, in an alternative embodiment, the kit clock 40 could have a diameter of 40 inches.

Referring to FIG. 1, the mounting template has a first face 23, a second face 29 (not shown), and a center hole 32. Indicia 24 is permanently imprinted on either the second face 29 or on the first face 23. Various means of imprinting the device of the present claimed invention include chemical, mechanical or laser etching, engraving or permanent ink. The indica 24 can consist of solid or broken lines as discussed below, or alphanumeric characters as required. The indicia 24 acts as a guide and provides a location for the user in providing an exterior point from the center of the mounting template 20 for mounting objects on a mounting surface 22. As shown in FIG. 1, in one alternative embodiment, indicia 24 is formed or printed on the first face 23 of the mounting template 20.

Figure 3:
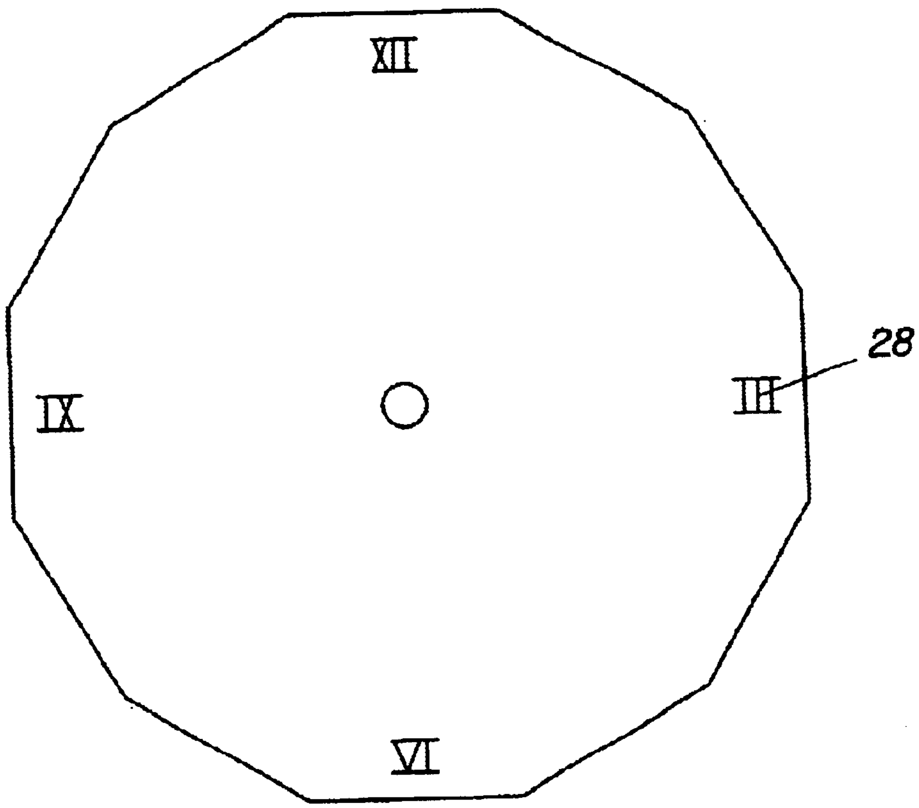
FIG. 3 is a front view showing another embodiment of a mounting template having indicia on a first face thereof and embodying certain principles of the invention.
Figure 4:
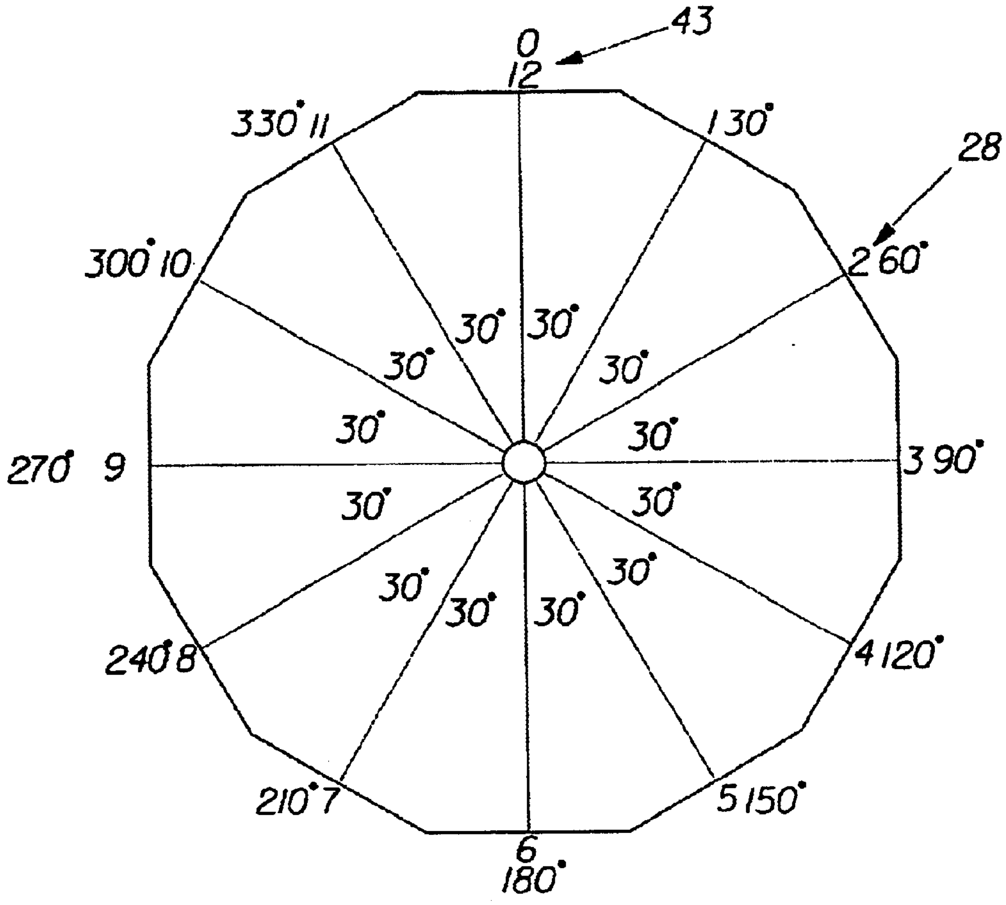
FIG. 4 is the indicia with marking of each measurement of time at a 30 degree angle.

Referring to FIG. 4, the indicia include measurements of time 28 in a substantially circular shape. Each measurement of time 28 may be located at a 30 degree point from the initial reference point 43 of the circle. The initial reference point 43 may begin anywhere in the circle. In one embodiment, the indicia 24 may include measurements of time 28 in equal degrees. For example, referring primarily to FIG. 4, twelve o'clock is located at 0 degrees, one o'clock is located at 30 degrees, two o'clock is located at 60 degrees, three o'clock is located at 90 degrees, four o'clock is located at 120 degrees, five o'clock is located at 150 degrees, six o'clock is located at 180 degrees, seven o'clock is located at 210 degrees, eight o'clock is located at 240 degrees, nine o'clock is located at 270 degrees, ten o'clock is located at 300 degrees, and eleven o'clock is located at 330 degrees. The measurements of time 28 are printed radially from the center hole 32 of the mounting template 20. As shown in FIG.1 and FIG. 4, Twelve o'clock, One o'clock, Two o'clock, Three o'clock, Four o'clock, Five o'clock, Six o'clock, Seven o'clock, Eight o'clock, Nine o'clock, Ten o'clock, and Eleven o'clock are shown. In an alternative embodiment, as shown in FIG. 3, the measurements of time 28 are Roman numerals. As shown in FIG. 3, the only Roman numerals shown are XII, III, VI, and IX. Thus, the measurements of time 28 can omit any given number, object, pattern of objects, or symbol.

Figure 6:
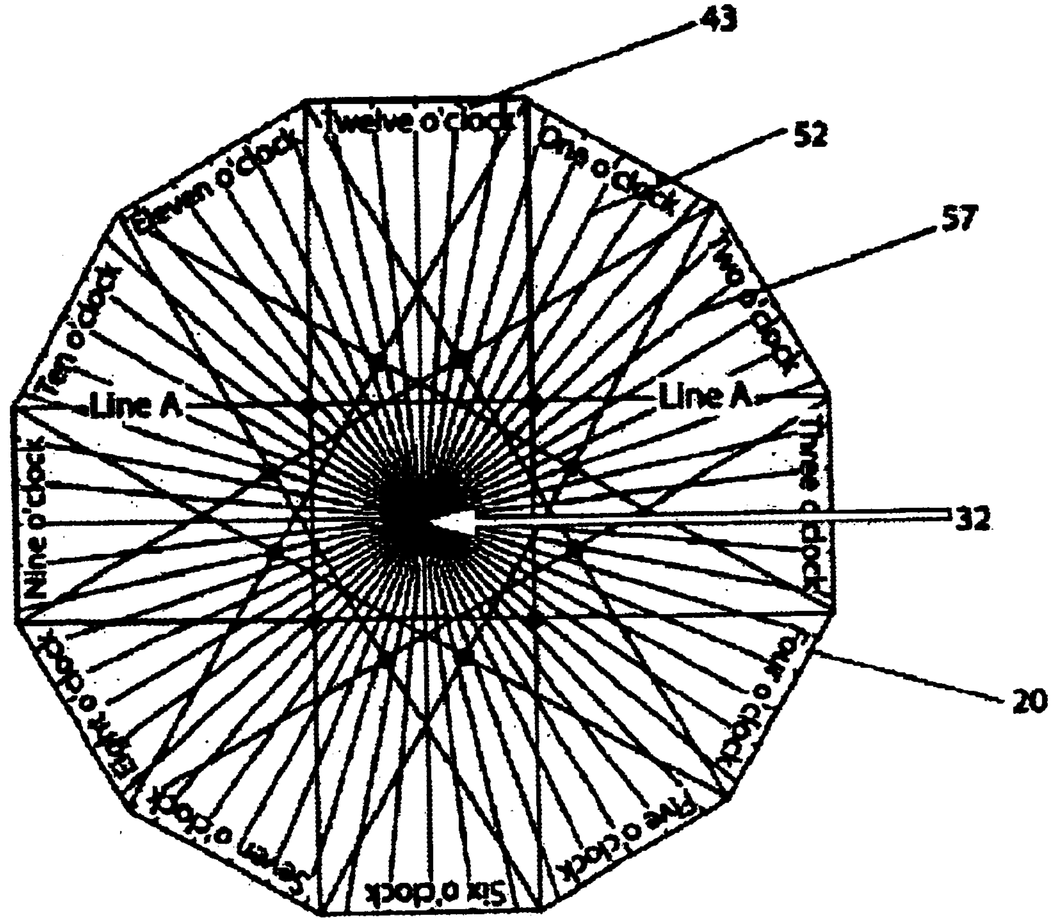
FIG. 6 is the indicia with markings of each measurement of time at a 6 degree angle and a one degree angle.

Referring to FIG. 1, also, the indicia 24 could also contain two vertical segments which encompass the measurement of time 28. For example, twelve o'clock and six o'clock are segmented off by the first vertical guide line 41 and the second vertical guide line 42. Another example, the first vertical guide line 33 and the second vertical guide line 34 segment the measurements of time of three o'clock and nine o'clock. In one embodiment, each set of vertical guide lines 44 may have predetermined graduations about its circumference marked in a multiple of 30 degrees. Each multiple of 30 degrees may represent an hour. Referring primarily to FIG. 6, in another embodiment, each set of vertical guide lines may have predetermined graduations about its circumference marked in a multiple of six degrees 52. Each multiple of six degree 52 may represent the minutes in an hour. In another embodiment, each set of vertical guide lines may have predetermined graduations about its circumference marked in a multiple of one degree. Each multiple of one degree may represent the seconds in an hour.

Referring to FIG. 1, the set of vertical guide lines 44 are used as guides for measurement purposes to place the numbers of the kit clock 40 on the mounting surface 22. This is to be explained more fully hereinafter in the discussion for the method of using the mounting template 20.

Referring to FIG. 1, moreover, the indicia 24 on the first face 23 of the mounting template 20 has predetermined graduations of indicators 35 extending radially outward from the center hole 32. By "indicators" 35 is meant a sign or symbol. The indicators 35 may be dots, squares, or any other shape to indicate the proper location of the graduated measuring device on the mounting template 20. The indicators 35 may be colored. The mounting template may also have a center hole 32. The center hole 32 may be marked on the template by a hole in the center of the mounting template 20 or by printing indicia indicating the center hole 32 on the mounting template 20.

Referring to FIG. 1, the center hole 32 of the mounting template 20 is located at a central point of the mounting template 20. The center hole 32 is used as a guide for mounting the center 25 of the kit clock 40. The placement of the center 25 of the kit clock 40 in a specific or desired position on the mounting surface 22 will exactly correlate to the center hole 32. The marking for the center 25 of the kit clock 40 is placed on a surface. The marking device may be a pin, a peg, a china marker, or other similar device. The mounting template is then placed over the marking using the center hole 32 as a guide. The marking for the center 25 of the kit clock 40 should be seen through the center hole 32 of the mounting template 20.

Referring to FIG. 1, the indicia 24 should also include a reference 36. This reference 36 indicates whether or not the mounting template is parallel to a surface above or below the mounting template 20. The reference may be a horizontal line 36. The horizontal line 36 may run across the entire mounting template or may run across a portion of the mounting template 20.

Figure 2:
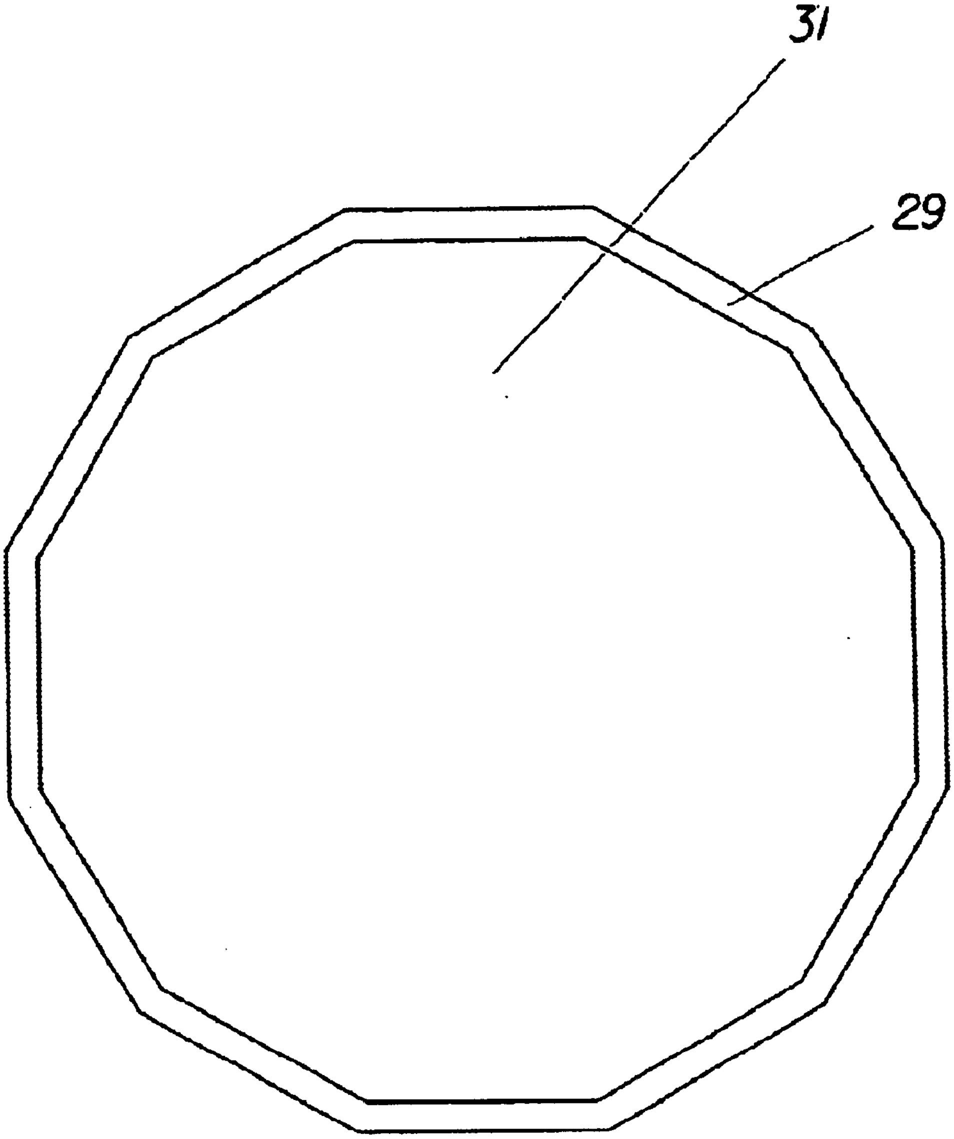
FIG. 2 is a perspective view showing a second face of the mounting template of FIG. 1 with adhesive material deposited thereon.

Referring to FIG. 2, the second face 29 of the mounting template is the side opposite the first face 23. As shown in FIG. 2, the second face 29 of the mounting template 20 may have applied thereto a low-tack pressure-sensitive backing of adhesive material which during periods of nonuse, is covered by a removable cover 31 made from light weight paper. The removable cover 31 precludes the adhesive backing from engaging and adhering to surfaces before placing the mounting template 20 on the mounting surface 20 undesirably. Thus, the adhesive backing provides a means for supporting the mounting template 20 in engagement with the mounting surface 22 on which the center 25 of the kit clock 40 and the numbers 21 of the kit clock 40 are to be mounted, but has a low-tack property so as not to peel off any portion of the mounting surface 22 to which the mounting template 20 is attached when the mounting template 20 is removed.

There may be several methods of using the mounting template. The first method of using the mounting template is as follows: A surface for mounting the kit clock 40 is selected. The location for placement of the center of the clock 25 is marked on the mounting surface 22. The mounting template 20 is placed over the mark so that the mark is shown through the center hole 32 of the mounting template 20. The horizontal line 36 of the mounting template 20 is placed parallel to the horizontal plane above or below the horizontal line 36 of the mounting template 20. Thus, the horizontal line 36 should be in a horizontally level plane to insure ultimate level mounting of the kit clock 40. Low stick tape is placed on the first face 23 to attach the mounting template 20 to the mounting surface 22.

Figure 8:
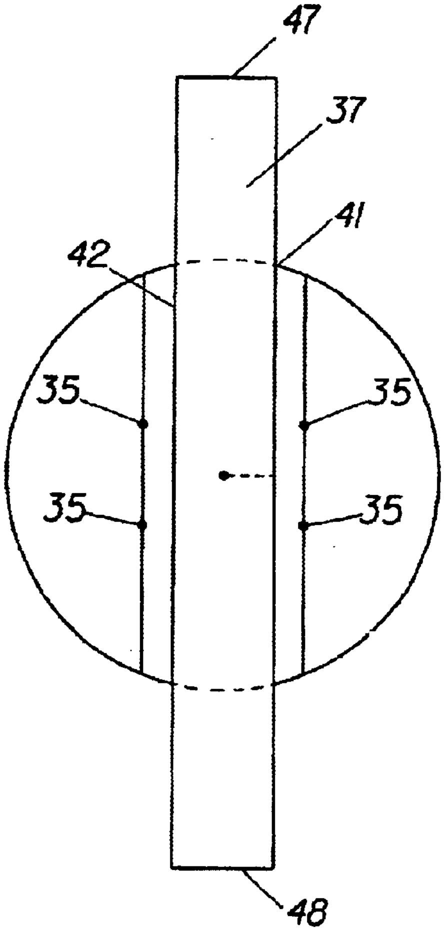
FIG. 8 is a yardstick as a graduated measuring device placed over the mounting template.

Referring primarily to FIG. 8, a graduated measuring device 45 is placed between the first vertical guide line 41 and the second vertical guide line 42 for the segment of twelve o'clock and six o'clock. The middle of the graduated measuring device 45 should be placed at the center hole of the mounting template 32. The indicators 35 are located on the lines of the two vertical guide lines 41, 42. The indicators 35 also serve as a guide for placement of the graduated measuring device. By "indicators" 35 is meant a sign or symbol. The indicators 35 may be dots, squares, or any other shape to indicate the proper location of the graduated measuring device on the mounting template. A light mark on the mounting surface is placed at the center of the top end of the graduated measuring device 47 and a light mark is placed on the surface at the center of the bottom end of the graduated measuring device 48.

Figure 7:
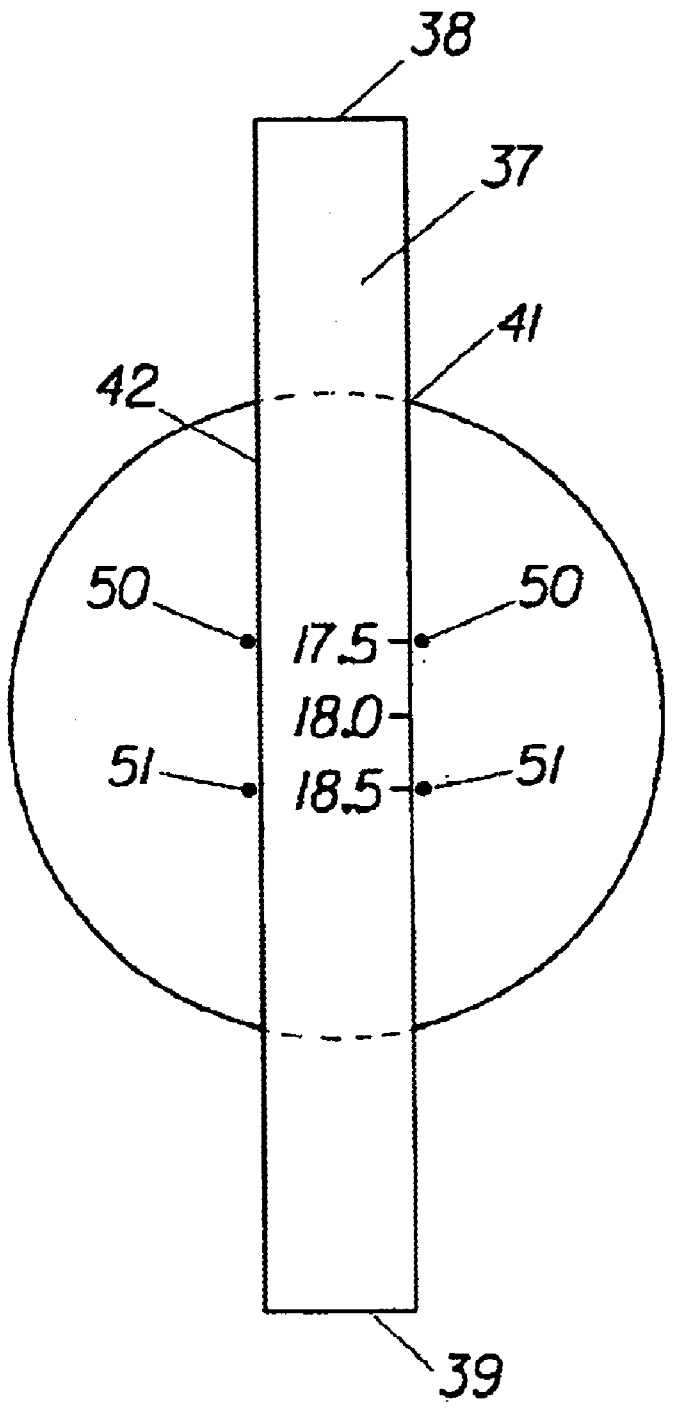
FIG. 7 is a graduated measuring device placed over the mounting template.

A graduated measuring device can be any device. In one non-limiting embodiment, the graduated device may be a ruler. Referring primarily to FIG. 7, the graduated measuring device may be a yardstick 37. The yardstick 37 is placed between the first vertical guide line 41 and the second vertical guide line 42 for twelve o'clock and six o'clock. Thus, the yardstick 37 should be encompassed between the first vertical guide line 41 and the second vertical guide line 42. The marker of the yardstick, which reads 17.5", should be placed between the first set of indicators 50. The marker of the yardstick, which reads 18.5", should be placed between the second set of indicators 51. The indicators 35 are located on the two vertical guide lines 41, 42. As shown in FIG. 3, by "indicators" 35 is meant a sign or symbol. The indicators 35 may be dots, squares, or any other shape to indicate the proper location of the yardstick on the mounting template. A light mark on the mounting surface is placed at the center of the top end of the yardstick 38 and a light mark is placed on the surface at the center of the bottom end of the yardstick 39. This process is repeated with centering the yardstick between the lines for each hour. For example, the next step would be for the one o'clock marking and then the two o'clock marking. As shown in FIG. 1, alternatively, the measurements of time 28 could be twelve o'clock, three o'clock, six o'clock, and nine o'clock. A nail, screw, or other preferred hanging mechanisms are placed at each mark indicating number placement. Next, objects or numbers are attached to the hanging mechanisms.

The clock may also be flush with the wall. The mounting template should then be removed from the mounting surface. The center of the clock 25 is then placed at the location where the mark was for the center hole 32 of the mounting template 20.

Figure 9:
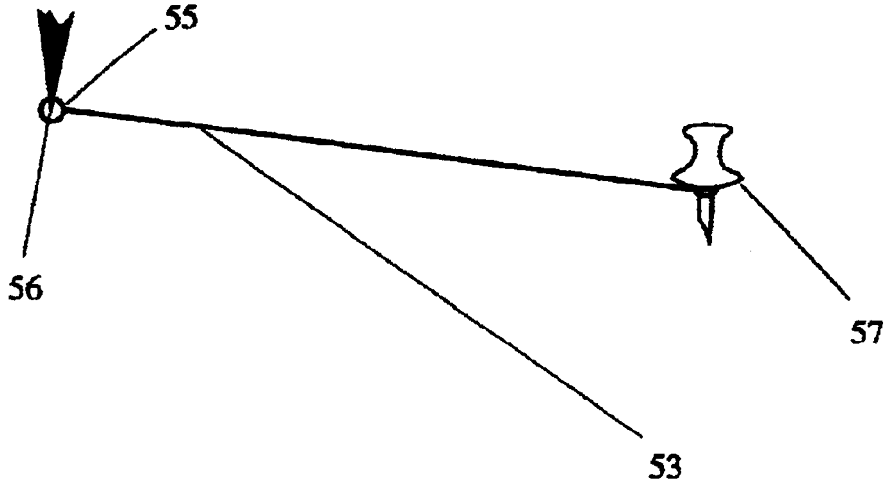
FIG. 9 is a pull string as a graduated measuring device.

In another alternative embodiment, as shown in FIG. 9, a graduated measuring device may be a pull string 53. The pull string 53 may be used to mount measurements of time 28 such as hour, minute, and/or second "measurements of time." The pull string 53 has a top end 55 and an anchor 54. The pull string may be made of a stiff wire with predetermined lengths. The pull string 53 may be in the form of a narrow strip of inflexible material. In an alternative embodiment, the pull string 53 may be joined to the anchor 54. By "joined" is meant to put or bring into close association or relation. By "anchor" is meant anything that gives the string stability. The anchor 54 could be a pin, nail, thumb tack, or screw.

The pull string 53 has one free end 55 projecting from the top end of the pull string so that it may be seized by the fingers when it is desired to locate the placement on the mounting surface to place the "measurements of time." Any grasping means known in the art could be attached to the free end 55 such as a tab.

A geometric shape with a hole may be joined to the free end 55 of the pull sting 55. The geometric shape may be a circle, triangle, rectangle or any shape. The geometric hole 56 may be used to grasp the free end 55 and as a guide to place a mark inside the geometric hole 56 on the mounting surface.

The proper method to use the pull string 53 graduated measuring device with the mounting template is as follows: The mounting template 20 is attached to the wall by low stick tape placed on the first face 23. The anchor 54 is placed at the center 32 of the template. As shown in FIG. 6, the pull string 53 is placed along each vertical line 57. Each vertical line which is measured from the initial reference point of circle 43 may be separated by six degrees or by one degree. A light mark on the mounting surface is placed in the geometric hole 56 which is at the top end 55 of the pull sting 53. This process is repeated by placing the pull string 55 along the lines of the mounting template 20. A nail, screw, or other preferred hanging mechanisms are placed at each mark indicating placement. Next, objects or numbers are attached to the hanging mechanisms.

The clock may also be flush with the wall. The mounting template should then be removed from the mounting surface. The center of the clock 25 is then placed where the center hole was marked by the template.

A kit may be employed which contains several anchor and pull strings sets with different and/or the same predetermined lengths. For example, three individual pull strings with a predetermined length of 40 inches may be included in a kit with or without a mounting template 20. A second example, a kit containing a pull string of a predetermined length of 40 inches, a second pull string of a predetermined length of 35 inches, and a third pull string of a predetermined length of 30 inches may be contained in one kit with or without a mounting template 20.

In another alternative embodiment, a graduated measuring device such as a pull string 53 may be used. The pull string 53 may be used for hour, minute, and/or second "measurements of time." The pull string 53 has a top end 55 and an anchor 54. The anchor 54 may have a pull string wound helically around it. (not shown). In an alternative embodiment, the pull string 53 may be joined to the anchor 54. By "joined" is meant to put or bring into close association or relation. By "anchor" is meant anything that gives the string stability. The anchor 54 could be a pin, nail, thumb tack, or screw.

The pull string 53 has one free end 55 projecting from the top end of the pull string so that it may be seized by the fingers when it is desired to locate the placement on the surface to place the "measurements of time." Any grasping means known in the art could be attached to the free end 55 such as a tab.

A geometric shape with a hole may be at the free end 55 of the pull sting 55. The geometric shape may be a circle, triangle, rectangle or any shape. The geometric hole 56 is used as a guide to place a mark on the mounting surface.

The pull string 53 has a winding length selected so that, when pulled, it creates a desired distance for placement of the "measurements of time." The pull string 53 may be in the form of a narrow strip of inflexible material.

The proper method to use the pull string 53 graduated measuring device with the mounting template is as follows: The mounting template 20 is attached to the wall by low stick tape placed on the first face 23. The anchor 54 is placed at the center 32 of the template. As shown in FIG. 6, the pull string 53 is placed along each vertical line 57. Each vertical line 57 may be separated by six degrees or by one degree. A light mark on the mounting surface is placed in the geometric hole 56 at the top end 55 of the pull sting 53. This process is repeated by placing the pull string 55 along the lines of the mounting template 20. A nail, screw, or other preferred hanging mechanisms are placed at each mark indicating number placement. Next, objects or numbers are attached to the hanging mechanisms.

The clock may also be flush with the wall. The mounting template should then be removed from the mounting surface. The center of the clock 25 is then placed where the center hole was marked by the template.

In an alternative embodiment, the mounting template 20 may have a low stick adhesive attached to the second face 29. If there is an adhesive attached to the second face 29. The user should remove the removable cover 31 from the second face 29 and then apply the mounting template 20 to the mounting surface. The user should then proceed as above by placing the graduated measuring device on the mounting template 20.

This process, which includes the use of the mounting template 20, provides an expeditious and accurate manner of mounting a clock.

Also, a mounting template having different angle and line patterns could be used without departing from the spirit and scope of the invention. In effect then, the principle embodied in mounting template 20 is universal and has widespread utility.

The above-described embodiments of course, are not to be construed as limiting the breadth of the present invention. Modifications, and other alternative constructions, will be apparent which are within the spirit and scope of the invention as defined in the appended claims.

What is claimed is:

1. A mounting template for placing a kit clock on a mounting surface which comprises:

a template having a first face on one side thereof;

a second face on a side opposite said first face;

a center hole located in the center of said mounting template;

indicia formed on the first face of said template said indicia provides a location of an exterior point for mounting of a first object on said mounting surface, said indicia providing a means for guiding the user in locating a mounting point, said indicia has a predetermined degree graduations of measurements of time about a circumference of said mounting template, a layout of predetermined degree graduations for a set of vertical lines, and indicators, said set of vertical lines and said indicators provide means for measuring a mounting point relative to said center hole located in the center of said mounting template.

2. The mounting template according to claim 1, wherein said first object is selected from the group consisting of numbers, objects, symbols, or combinations thereof.

3. The mounting template according to claim 1, wherein said measurements of time is selected from the group consisting of numerals, roman numerals, or foreign numbers, or combinations thereof.

4. The mounting template according to claim 1, wherein said predetermined degree graduations of measurements of time about a circumference of said mounting template is 30 degrees.

5. The mounting template according to claim 1, wherein said layout of predetermined degree graduations for a set of vertical lines is 30 degrees.

6. The mounting template according to claim 1, further comprising an adhesive material applied to the second face of the template for supporting the template in engagement with the mounting surface to provide therefor the use of the indicia in assisting in determining the location of the mounting for an attachment to be formed on said mounting surface.

7. The mounting template according to claim 6, wherein said adhesive material having a removable cover located over said adhesive material to prevent said adhesive material from undesirably contacting and adhering to other surfaces.

8. A method for simplifying the layout of clocks comprising:

providing a mounting template;

locating a surface to place a clock;

marking a first mark on a surface for a center of said clock;

aligning said marking over a center of said mounting template;

leveling a first reference located on said template to a second reference which is horizontal to said first reference wherein said template having a first face, a second face on a side opposite said first face, and a center hole;

attaching tape to said first face;

placing a graduated measuring device having a first end and a second end on top of said template between a first indicator and a second indicator at a predetermined location on said graduated measuring device;

marking on the surface a mark at the first center end of said measuring device and the second center end of said measuring device;

inserting a mounting mechanism at said mark;

attaching at least one object to said markings;

attaching said mounting mechanism at said first mark for said center hole; and attaching a main object to said hanging mechanism for said first mark.

9. The method according to claim 8 wherein the graduated measuring device is a yardstick.

10. The method according to claim 8 wherein the graduated measuring device is a pull string.

11. The mounting kit for placing a kit clock on a mounting surface which comprises:

a graduated device and a template;

said template having a first face on one side thereof;

a second face on a side opposite said first face;

a center hole located in the center of said mounting template;

indicia formed on the first face of said template said indicia provides a location of an exterior point for mounting of a first object on said mounting surface, said indicia providing a means for guiding the user in locating a mounting point, said indicia has a predetermined degree graduations of measurements of time about a circumference of said mounting template, a layout of predetermined degree graduations for a set of vertical lines, and indicators, said set of vertical lines and said indicators provide means for measuring a mounting point relative to said center hole located in the center of said mounting template.

12. The mounting kit according to claim 11, wherein said graduated device is a pull string.

13. The mounting kit according to claim 11, wherein said graduated device is a yardstick.

14. The mounting kit according to claim 11, wherein said graduated device is a ruler.

* * * * *